United States Patent
Urata

(10) Patent No.: US 7,026,388 B2
(45) Date of Patent: Apr. 11, 2006

(54) CONDUCTIVE RESIN COMPOSITION AND PROCESS FOR PRODUCING THE SAME

(75) Inventor: Yoshihiro Urata, Ube (JP)

(73) Assignee: UBE Industries, Ltd., Ube (JP)

( * ) Notice: Subject to any disclaimer, the term of this patent is extended or adjusted under 35 U.S.C. 154(b) by 653 days.

(21) Appl. No.: 10/098,908

(22) Filed: Mar. 14, 2002

(65) Prior Publication Data

US 2003/0055154 A1 Mar. 20, 2003

(30) Foreign Application Priority Data

Mar. 28, 2001 (JP) ............................. 2001-092307
Apr. 9, 2001 (JP) ............................. 2001-109442

(51) Int. Cl.
*C08K 3/04* (2006.01)

(52) U.S. Cl. ...................................... 524/495; 524/496

(58) Field of Classification Search ................ 524/495, 524/496

See application file for complete search history.

(56) References Cited

U.S. PATENT DOCUMENTS 5,571,859 A  11/1996  Yukishige et al.
6,051,307 A  4/2000  Kido et al.

FOREIGN PATENT DOCUMENTS

JP  60-202154 A  10/1985

*Primary Examiner*—Edward J. Cain
(74) *Attorney, Agent, or Firm*—Frishauf, Holtz, Goodman & Chick, P.C.

(57) ABSTRACT

A conductive resin composition comprising a thermoplastic resin and a carbon fiber, the carbon fiber being present in an amount of 10 to 50 parts by weight, based on 100 parts by weight of the resin composition, wherein 10–50% by weight of the carbon fiber is comprised of a carbon fiber having a fiber length after kneading and pelletizing of 500 μm or more; a conductive resin composition comprising a thermoplastic resin and a carbon fiber, wherein the carbon fiber is present in an amount of 10–50 parts by weight based on 100 parts by weight of the resin composition, wherein 3–12 parts by weight of the carbon fiber is a carbon fiber having a fiber length after kneading and pelletizing of 50 μm or less and 7–38 parts by weight of the carbon fiber is a carbon fiber having a fiber length after kneading and pelletizing of more than 50 μm; and processes for producing the same.

8 Claims, 2 Drawing Sheets

Use ASTM No. 1 dumbbell (thickness: 3 mm)

Heat-pressing metal nuts by soldering iron → Measuring resistance between the nuts

CONDUCTIVE RESIN COMPOSITION AND PROCESS FOR PRODUCING THE SAME

BACKGROUND OF THE INVENTION

1. Field of the Invention

The present invention relates to a conductive resin composition from which a molded product can be formed wherein the material has high conductivity, excellent effect of shield against electromagnetic waves, high rigidity, and stable physical properties as well as excellent surface smoothness. More particularly, the present invention is concerned with a conductive resin composition which can be advantageously used as a housing part for electrical apparatus, especially as a housing for personal computer and a housing for information terminal such as a mobile phone, and processes for preparing the same.

2. Prior Art

Resin compositions used in electromagnetic wave shield materials, such as a housing and a cover for personal computer, are required to have such high conductivity that they can shield the contents from electromagnetic waves. As a resin composition which meets such a demand, a resin composition comprising a thermoplastic resin having conductive filler dispersed therein as a matrix has been proposed.

As filler incorporated into the thermoplastic resin, carbon fiber having conductivity and an effect as a reinforcing agent has generally been used. A molded product comprising a resin composition in which carbon fiber is formulated into a thermoplastic resin has excellent rigidity and excellent conductivity. However, when such a molded product is used as a shield against electromagnetic waves, it must have even higher conductivity, and, for obtaining the molded product having a higher conductivity, it is necessary to incorporate a large amount of carbon fiber into the thermoplastic resin.

However, when a molded product is formed from the resin composition having incorporated thereinto a large amount of carbon fiber as mentioned above, the material has problems not only in that the molded product suffers large warpage due to orientation of the carbon fiber, but also in that the large amount of carbon fiber incorporated tends to cause the physical properties of the material to be lowered and further cause the cost to increase.

For solving the above problems, Japanese Provisional Patent Publication No. 181532/1991 has proposed a resin composition comprising a thermoplastic resin, such as a polyester resin, a polyethylene resin, a polypropylene resin, a polyamide resin, an acrylonitrile-butadiene-styrene (hereinafter referred to as "ABS") copolymer, a polyacetal resin, a modified polyphenylene oxide resin, or a polycarbonate resin, which resin has incorporated thereinto 5 to 30% by weight of swollen graphite having a particle diameter of 20 μm or less. A molded product comprised of this resin composition suffers small warpage, but it has low conductivity, as compared to the molded product containing carbon fiber.

On the other hand, the conductivity is largely influenced by the carbon fiber length, and, when a thermoplastic resin and carbon fiber are kneaded together, the carbon fiber is broken into short one, so that a satisfactory conductivity cannot be obtained. For solving such a problem, long-length fiber pellets having a pellet size which is the same as the carbon fiber length (pellet size=carbon fiber length) are used. However, since all the fiber is long-length fiber or a large amount of long-length fiber is incorporated, there are problems that the surface of the molded product is roughened or the physical properties are unstable.

SUMMARY OF THE INVENTION

The present invention has solved the above-mentioned problems, and provides a conductive resin composition from which a molded product can be formed wherein the material has high conductivity, excellent effect of shield against electromagnetic waves, high rigidity, and uniform physical properties as well as excellent surface smoothness.

The present inventor has conducted extensive and intensive studies with a view toward solving the above-mentioned problems. As a result, it has been found that, when a thermoplastic resin and carbon fiber are kneaded together, by conducting the operation of the kneading after feeding the carbon fiber in the order of carrying, kneading, carrying, damming, and carrying as shown in FIG. 1, the amount of the carbon fiber broken can be reduced, so that the carbon fiber length distribution broadens, making it possible to obtain a resin composition having high conductivity and excellent surface smoothness, and thus the present invention has been completed.

Also, it has been found that, when a thermoplastic resin and carbon fiber are kneaded together, by feeding the carbon fiber divided into two portions or more and subjecting to mixing, a ratio of fine carbon fiber having a length of 50 μm or less can be made large, making it possible to obtain a resin composition having high and stable conductivity and excellent surface smoothness, and thus the present invention has been completed.

Specifically, as a first embodiment of the present invention, it is directed to a conductive resin composition which comprises a thermoplastic resin and carbon fiber, wherein the carbon fiber is present in an amount of 10 to 50 parts by weight based on 100 parts by weight of the resin composition, and 10 to 50% by weight of the carbon fiber is one having a fiber length of 500 μm or more.

In addition, the present invention is also directed to a process for producing the conductive resin composition, which process comprises: feeding a thermoplastic resin to a kneader from the top portion thereof; and feeding carbon fiber to the kneader from the medium portion thereof to melt and knead the resulting mixture, wherein the operation of the kneading after feeding the carbon fiber is conducted in the order of carrying, kneading, carrying, damming and carrying.

Moreover, as a second embodiment, the present invention is directed to a conductive resin composition which comprises a thermoplastic resin and carbon fiber, wherein the carbon fiber is present in an amount of 10 to 50 parts by weight based on 100 parts by weight of the resin composition, where 3 to 12 parts by weight of the carbon fiber is one having a fiber length of 50 μm or less and 7 to 38 parts by weight of the same is one having a fiber length of more than 50 μm.

In addition, the present invention is also directed to a process for producing the conductive resin composition, which process comprises the steps of mixing and feeding a thermoplastic resin and carbon fiber to a kneader to melt and knead the resulting mixture, wherein the carbon fiber is fed from at two or more portions by dividing it into two or more.

Furthermore, as a third embodiment, the present invention is directed to a conductive resin composition which comprises a thermoplastic resin and carbon fiber, wherein the carbon fiber is present in an amount of 10 to 50 parts by weight based on 100 parts by weight of the resin composition, 10 to 50% by weight of the carbon fiber is one having a fiber length of 500 µm or more, and 3 to 12 parts by weight of the carbon fiber is one having a fiber length of 50 µm or less and 7 to 38 parts by weight of the same is one having a fiber length of more than 50 µm.

Also, the present invention is also directed to a process for producing the conductive resin composition, which process comprises: feeding a thermoplastic resin to a kneader from the top portion thereof; and feeding carbon fiber to the kneader from the medium portion thereof to melt and knead the resulting mixture, wherein the operation of the kneading after feeding the carbon fiber is conducted in the order of carrying, kneading, carrying, damming and carrying; and the carbon fiber is fed from at two or more portions by dividing it into two or more.

Also, the present invention is directed to a molded product prepared by molding the above-mentioned any one of the conductive resin compositions.

DESCRIPTION OF THE PREFERRED EMBODIMENTS

Figure 1:
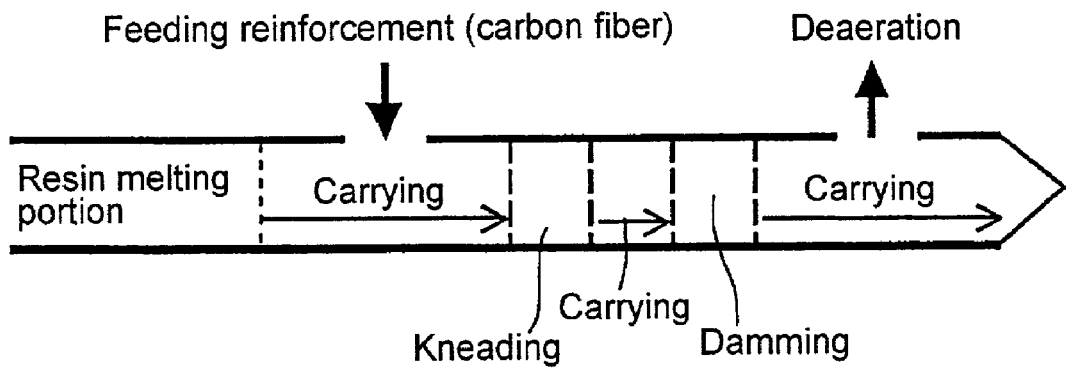
FIG. 1 is a schematic view showing the operation of kneading a thermoplastic resin and carbon fiber by means of a kneader in Example 1 of the present invention.

In the first embodiment of the present invention, the conductive resin composition of the present invention comprises a thermoplastic resin and carbon fiber, wherein the carbon fiber is present in an amount of 10 to 50 parts by weight based on 100 parts by weight of the resin composition, and 10 to 50% by weight of the carbon fiber is comprised of one having a fiber length of 500 µm or more.

When the amount of the carbon fiber in the resin composition is less than 10 parts by weight, a stable conductivity is not exhibited and the resulting molded product has poor rigidity. On the other hand, when the amount of the carbon fiber exceeds 50 parts by weight, the mechanical physical properties of the resulting molded product are lowered and the molded product suffers large warpage due to orientation of the carbon fiber, thus causing the appearance of the molded product to be poor.

When the content of the carbon fiber having a fiber length of 500 µm or more in the carbon fiber is less than 10% by weight, a satisfactory conductivity cannot be obtained. On the other hand, when the content thereof exceeds 50% by weight, scattering of the physical properties becomes large and the surface of the resulting molded product becomes rough, thus causing the appearance to be poor.

In the second embodiment of the present invention, the conductive resin composition of the present invention comprises a thermoplastic resin and carbon fiber in total 100 parts by weight, wherein an amount of the carbon fiber is 10 to 50 parts by weight based on 100 parts by weight of the resin composition, where 3 to 12 parts by weight of the carbon fiber is one having a fiber length of 50 µm or less and 7 to 38 parts by weight of the same is one having a fiber length of more than 50 µm.

The reason why the amount of the carbon fiber in the resin composition is limited to the above range is as mentioned above.

When the content of the carbon fiber having a fiber length of 50 µm or less in the carbon fiber is less than 3 parts by weight, the surface of the resulting molded product becomes rough, thus causing the appearance to be poor, whereas when the content thereof exceeds 12 parts by weight, a satisfactory conductivity cannot be obtained.

When the content of the carbon fiber having a fiber length of more than 50 µm in the carbon fiber is less than 7 parts by weight, a satisfactory conductivity cannot be obtained, whereas when the content thereof exceeds 38 parts by weight, the surface of the resulting molded product becomes rough, thus causing the appearance to be poor.

In the third embodiment of the present invention, the conductive resin composition of the present invention comprises a thermoplastic resin and carbon fiber, wherein the carbon fiber is present in an amount of 10 to 50 parts by weight based on 100 parts by weight of the resin composition, 10 to 50% by weight of the carbon fiber is comprised of one having a fiber length of 500 µm or more, and 3 to 12 parts by weight of the carbon fiber is one having a fiber length of 50 µm or less and 7 to 38 parts by weight of the same is one having a fiber length of more than 50 µm.

The reasons why the amount of the carbon fiber in the resin composition and the amounts of the carbon fibers having the respective fiber lengths are limited to the above range are as mentioned above.

Examples of thermoplastic resins as a main component of the conductive resin composition include polyamide resins, such a nylon 6, nylon 66 and nylon 12, polyester resins, such as polyethylene terephthalate and polybutylene terephthalate, polycarbonate resins, polyallylate resins, polyvinyl chloride resins, polyethylene resins, chlorinated polyethylene resins, chlorinated polypropylene resins, polypropylene resins, polystyrene resins, acrylonitrile-styrene copolymer resins, ABS resins, polyvinylidene chloride resins, polyvinyl acetate resins, thermoplastic polyimide resins, polybutadiene resins, polyacetal resins, ionomer resins, ethylene-vinyl chloride copolmyer resins, ethylene-vinyl acetate copolymer resins, polyphenylene oxide resins, modified polyphenylene oxide resins, polysulfone resins, acrylic resins, methacrylic resins, phenoxy resins, polyvinyl formal resins, polyvinyl butyral resins, and mixtures of two or more of these resins. Of these, preferred are polyamide resins, polyester resins, polycarbonate resins, polycarbonate-ABS resins (ABS resins blended with polycarbonate), and polyallylate resins, and, among these, especially preferred are polyamide resins from the view-point of obtaining excellent affinity to carbon fiber.

Examples of polyamide resins include homopolyamides and copolyamides obtained by polymerizing monomers such as lactam, aminocarboxylic acid and/or diamine, and a dicarboxylic acid, and mixtures thereof. Specifically, examples include polycaproamide (nylon 6), polyhexamethylene adipamide (nylon 66), polytetramethylene adipamide (nylon 46), polyhexamethylene sebacamide (nylon 610), polyhexamethylene dodecamide (nylon 612), polyundecamethylene adipamide (nylon 116), polybis(4-aminocyclohexyl)methane dodecamide (nylon PACM12), polybis(3-methyl-4-aminocyclohexyl)methane dodecamide (nylon dimethyl PACM12), polynonamethylene terephthalamide (nylon 9T), polyundecamethylene terephthalamide (nylon 11T), polyundecamethylene hexahydroterephthalamide (nylon 11T(H)), polyundecamide (nylon 11), polydodecamide (nylon 12), polytrimethylhexamethylene terephthalamide (nylon TMDT), polyhexamethylene terephthalamide (nylon 6T), polyhexamethylene isophthalamide (nylon 6I), polymethaxylylene adipamide (nylon MXD6), and copolymers and mixtures thereof. Of these, especially preferred are nylon 6, nylon 66, nylon 12, and copolymerized polyamide and mixed polyamide thereof.

In the present invention, when amorphous polyamide is incorporated into the above crystalline polyamide resin, a resin composition having excellent appearance can be obtained. Examples of amorphous polyamide resins include isophthalic acid/terephthalic acid/hexamethylenediamine/bis(3-methyl-4-aminocyclohexyl)methane polycondensates, terephthalic acid/2,2,4-trimethylhexamethylenediamine/2,4,4-trimethylhexamethylenediamine polycondensates, isophthalic acid/bis(3-methyl-4-aminocyclohexyl)methane/ω-laurolactam polycondensates, isophthalic acid/terephthalic acid/hexamethylenediamine polycondensates, isophthalic acid/2,2,4-trimethylhexamethylenediamine/2,4,4-trimethylhexamethylenediamine polycondensates, isophthalic acid/terephthalic acid/2,2,4-trimethylhexamethylenediamine/2,4,4-trimethylhexamethylenediamine polycondensates, and isophthalic acid/bis(3-methyl-4-aminocyclohexyl)methane/ω-laurolactam polycondensates. The amorphous polyamide resins include those in which the benzene ring in the terephthalic acid component and/or the isophthalic acid component constituting the above-mentioned polycondensate is substituted with an alkyl group or a halogen atom. Further, these amorphous polyamides can be used in combination of two or more. Preferably, isophthalic acid/terephthalic acid/hexamethylenediamine/bis(3-methyl-4-aminocyclohexyl)methane polycondensates, terephthalic acid/2,2,4-trimethylhexamethylenediamine/2,4,4-trimethylhexamethylenediamine polycondensates, and mixtures of isophthalic acid/terephthalic acid/hexamethylenediamine/bis(3-methyl-4-aminocyclohexyl)methane polycondensates and terephthalic acid/2,2,4-trimethylhexamethylenediamine/2,4,4-trimethylhexamethylenediamine polycondensates are used.

From the viewpoint of reducing the crystalline property of the polyamide resin, it is preferred that the amorphous polyamide resin has a heat of fusion of 1 cal/g or less, as measured using a differential scanning calorimeter in a nitrogen gas atmosphere at a temperature elevation rate of 16° C./min.

With respect to the ratio of the crystalline polyamide incorporated into the amorphous polyamide, there is no particular limitation, and it is preferred that the (crystalline polyamide):(amorphous polyamide) weight ratio is 50:50 to 98:2. When the amount of the amorphous polyamide is less than 2% by weight, the resulting composition which has incorporated thereinto carbon fiber in a high content tends to have poor surface smoothness, i.e., low gloss. On the other hand, when the amount of the amorphous polyamide is more than 50% by weight, the resulting resin composition which has incorporated thereinto carbon fiber in a high content must be shaped using a mold at a high temperature for obtaining a smooth surface since the amorphous polyamide generally has a high melt viscosity, and further the crystalline property of the composition becomes low to prolong the molding cycle in, e.g., injection molding, thus causing the productivity to be low.

With respect to the relative viscosity of the polyamide resin used in the preset invention, there is no particular limitation, and it is preferred that the relative viscosity is in the range of from 1.4 to 4.0, as measured under conditions such that 96% by weight concentrated sulfuric acid is used as a solvent, the temperature is 25° C., and the concentration is 1 g/dl. When the relative viscosity is less than 1.4, it is difficult to take off the composition after melt and kneading due to the low viscosity, thus making it difficult to obtain desired physical properties of the composition. On the other hand, when the relative viscosity is more than 4.0, the fluidity of the composition is poor during molding processing due to the high viscosity and therefore a satisfactory injection pressure is not applied to the composition, thus making it difficult to prepare molded products.

In the present invention, as examples of carbon fiber which functions as a conductive agent and a reinforcing agent, there can be mentioned polyacrylonitrile (PAN) carbon fiber and pitch carbon fiber each having high strength and high conductivity. Specific examples of PAN carbon fiber include BESFIGHT chopped fiber and BESFIGHT milled fiber manufactured by TOHO RAYON CO., LTD.; TORAYCA chopped fiber and TORAYCA milled fiber manufactured BY TORAY INDUSTRIES INC.; PYROFIL manufactured by MITSUBISHI RAYON CO., LTD.; and FORTAFIL manufactured by FORTAFIL FIBERS, INC., and specific examples of pitch carbon fiber include DONACARBO chopped fiber and DONACARBO milled fiber manufactured by OSAKA GAS CHEMICALS CO., LTD.; and KRECA chopped fiber and KRECA milled fiber manufactured by KUREHA CHEMICAL INDUSTRY CO., LTD.

In the first embodiment of the present invention, carbon fiber preferably has a fiber length before kneading of 0.1 to 12 mm, especially preferably 1 to 8 mm. Further, it is preferred that carbon fiber has a fiber diameter in the range of from 5 to 15 μm.

In the second embodiment of the present invention, carbon fiber preferably has a fiber length before kneading of 0.1 to 7 mm, especially preferably 1 to 6 mm. Further, it is preferred that carbon fiber has a fiber diameter in the range of from 5 to 15 μm.

In the conductive resin composition having the above-mentioned construction, from the viewpoint of improving the resulting molded product in flame retardancy in addition to the above-mentioned properties, it is preferred that a bromine type flame retardant or a phosphorus type flame retardant is incorporated in an amount of 50 parts by weight or less, preferably 20 to 40 parts by weight based on 100 parts by weight of the resin composition. When the amount of the flame retardant incorporated exceeds 50 parts by weight, the mechanical strength of the resulting molded product is likely to be deteriorated.

It is preferred that the bromine type flame retardant used in the present invention has a bromine content of 50 to 90% by weight. When the bromine content is less than 50% by weight, the flame retardant has a poor flame retardancy effect, and therefore it is necessary to add a large amount of the flame retardant, and further the mechanical strength is impaired. On the other hand, when the bromine content exceeds 90% by weight, bromine is likely to be liberated during molding processing and the effect of the present invention cannot be exhibited satisfactorily. Specific examples include brominated polystyrene, brominated crosslinked aromatic polymers, brominated styrene-maleic anhydride copolymers, brominated polyphenylene ether, brominated epoxy resins, and brominated phenoxy resins, and, of these, brominated polystyrene is preferably used.

Examples of brominated polystyrene used here include one which is obtained by adding bromine to polystyrene, one which is obtained by polymerizing styrene monomers to which bromine is added, and mixtures of these, and especially preferred are PDBS manufactured by GREAT LAKES CHEMICAL CORPORATION, which is obtained by polymerizing styrene monomers to which bromine is added, PYROCHECK 68PB manufactured by FERRO CORPORATION, which is obtained by adding bromine to polystyrene, from the viewpoint of obtaining excellent color tone, excellent fluidity, and excellent heat resistance.

As the phosphorus type flame retardant, various allotropes of inorganic phosphorus (red, violet, and black phosphorus) commercially available in the name of phosphorus and organic phosphorus flame retardants, for example, organic phosphates can be used. In engineering plastic resins such as polyamide processed at high temperatures, red phosphorus and melamine phosphate are preferred. With respect to the form of red phosphorus when incorporated into the thermoplastic resin, there is no particular limitation, and, from the viewpoint of facilitating dispersion of red phosphorus in the resin composition, it is desired to use red phosphorus in the form of being finely divided generally, for example, in the form of being divided into particles having a particle diameter of 200 µm or less, preferably in the form of particles having an average particle diameter of 1 to 100 µm.

Red phosphorus may be solely used, but it is preferably of a heat-resistance improved type in a form such that the surface of the red phosphorus particle is coated with a polymer film or an inorganic coating material. Preferred examples of polymers for coating the surface of the red phosphorus particle include epoxy resins; polymers comprising maleic acid, fumaric acid, or an allyl unsaturated linkage; unsaturated polyester having a melting temperature of 50 to 90° C. and having an weight average molecular weight of 10,000 or less; novolak-type thermoplastic phenol-formaldehyde polycondensates; and thermoplastic phenol-isobutyl aldehyde polycondensates, and, of these, thermoplastic phenol-isobutyl aldehyde polycondensates can be preferably used. With respect to the amount of the above polymer incorporated, there is no particular limitation, and the amount of the polymer is 90% by weight or less, generally, preferably 2 to 50% by weight based on the total weight of the mixture of the red phosphorus and the polymer for coating.

Further, in the resin composition of the present invention, for obtaining a satisfactory effect of a flame retardant, a flame retardant aid may be incorporated in addition to the above-mentioned flame retardant. Examples of flame retardant aids used in combination with a bromine type flame retardant include antimony trioxide, sodium antimonate, tin (IV) oxide, iron (III) oxide, zinc oxide and zinc borate, and examples of flame retardant aids used in combination with a red phosphorus type flame retardant include melamine polyphosphate, melamine cyanurate and magnesium hydroxide. It is preferred that the weight ratio of the bromine type flame retardant to the flame retardant aid is 5:1 to 1:1, and that the weight ratio of the red phosphorus type flame retardant to the flame retardant aid is 1:2 to 1:7.

Further, in the conductive resin composition of the present invention, if desired, various additives such as a release agent, a thermal stabilizer, an antioxidant, a light stabilizer, a lubricant, a pigment, a plasticizer, a cross-linking agent, an impact modifier, an inorganic substance and a dye, and carbon and metal conductive aids may be added, and these are added when the resin composition is melted and kneaded or melt-molded.

The conductive resin composition of the present invention is produced by melting and kneading together a thermoplastic resin, carbon fiber, and optionally a flame retardant and various additives using a kneader and pelletizing the resulting mixture. In the first embodiment, the thermoplastic resin is fed to the kneader from the top portion thereof, and the carbon fiber is fed to the kneader from the medium portion thereof, wherein the operation of the kneading after feeding the carbon fiber is conducted in the order of carrying, kneading, carrying, damming, and carrying as shown in FIG. 1.

Figure 2:
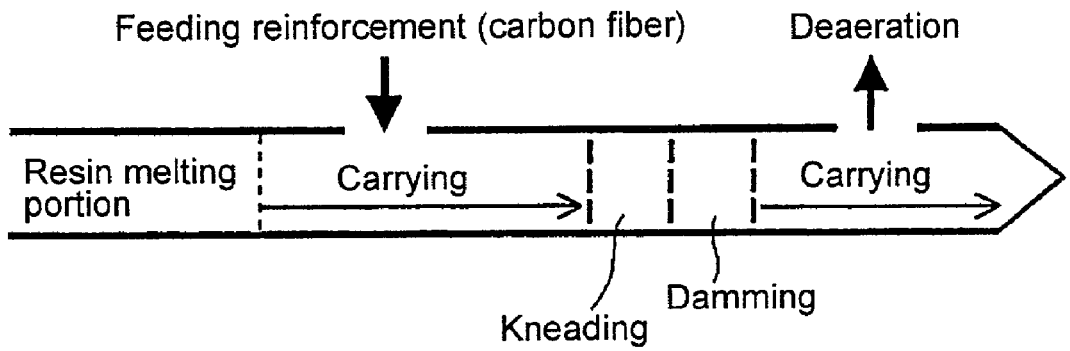
FIG. 2 is a schematic view showing the operation of kneading a thermoplastic resin and carbon fiber by means of a kneader in Comparative Example 1 of the present invention.

Conventionally, when a thermoplastic resin and carbon fiber are kneaded by means of a kneader, the operation of the kneading after feeding the carbon fiber has been conducted in the order of carrying, kneading, damming, and carrying as shown in FIG. 2. The reason for such an operation order is because it is considered that, for intimately mixing the thermoplastic resin and carbon fiber, kneading is needed in a state such that the carrying is once stopped in the dam. However, in this method, the carbon fiber is disadvantageously broken during kneading, for example, 3 mm-length carbon fiber before kneading is broken into about 300 µm-length fiber, so that a resin composition having a satisfactory conductivity cannot be obtained.

By contrast, in the present invention, by conducting the operation of the kneading after feeding the carbon fiber in the order of carrying, kneading, carrying, damming, and carrying as shown in FIG. 1, the amount of the carbon fiber broken can be reduced, and carbon fiber having a fiber length of 500 µm or more remains in an amount of 10 to 50% by weight, so that a resin composition having high conductivity and excellent surface smoothness can be obtained.

The conductive resin composition of the present invention is produced by melting and kneading together a thermoplastic resin, carbon fiber, and optionally a flame retardant and various additives using a kneader and pelletizing the resulting mixture. In the second embodiment, the carbon fiber is fed to the kneader from two or more portions thereof by dividing into two or more, and mixing is carried out. For example, the thermoplastic resin and 3 to 12 parts by weight of the carbon fiber are fed from the top portion of the kneader, and 7 to 38 parts by weight of the remaining carbon fiber is fed to the kneader from the medium portion thereof to carry out mixing.

When the carbon fiber is fed from one portion, if the amount is a little, conductivity is not sufficient, while if the amount is large, the molded product suffers large warpage due to orientation of the carbon fiber, whereby the surface property becomes poor. On the other hand, by feeding the carbon fiber by dividing into two or more portions as in the present invention, the firstly fed carbon fiber is strongly kneaded at a shearing and melting zone of the resin, so that it becomes fine fiber having a length of 50 µm or less, and the carbon fiber subsequently fed does not pass the above kneading zone, so that it becomes fiber having a length of more than 50 µm. As a result, a resin composition having high conductivity and excellent surface smoothness can be obtained.

For obtaining a molded product from the thus obtained resin composition, the resin composition may be subjected to either injection molding using an injection molding machine or press molding using a press molding machine.

The molded product comprised of the conductive resin composition having the above-mentioned construction has high conductivity, excellent effect of shield against electromagnetic waves, high rigidity, and uniform physical properties as well as excellent surface smoothness. Therefore, the molded product can be advantageously used as fuel parts, electric and electronic parts, and a housing for electrical apparatus, for example, a housing and a cover for personal computer, a mechanical bearing, a mechanical packing seal agent, a fuel tube, a fuel connector, and parts for apparatus used in clean room, printer, and copying machine.

EXAMPLES

In the following, the present invention will be described in detail with reference to the Examples, which should not be construed as limiting the scope of the present invention. In the following Examples and Comparative Examples, various physical property values were measured by the following methods.

(Measurement of Carbon Fiber Length Distribution)

Pellets of a thermoplastic resin containing carbon fiber were dissolved in sulfuric acid having a concentration of 96% or more, and the carbon fiber was taken out from the resulting solution and a photograph of magnified carbon fiber was taken by means of a microscope. The fiber length of the carbon fiber shown in the photograph was measured, and weight fractions of the less than 50 μm fiber, the 50 μm to less than 500 μm fiber, and the 500 μm or more fiber were calculated from the distribution of the fiber length.

(Conductivity)

Figure 5:
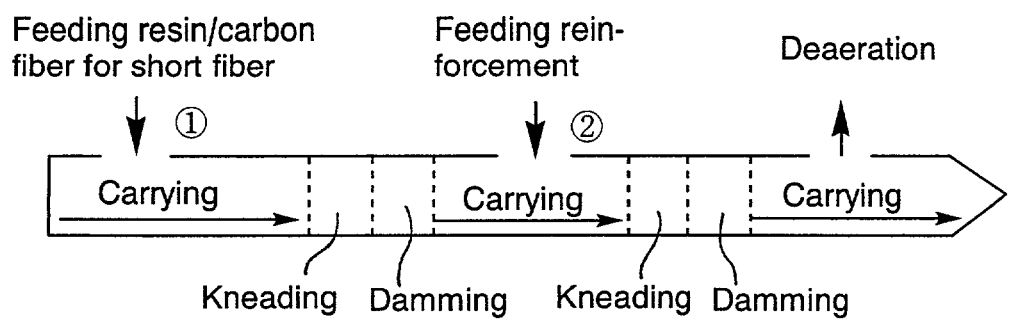
FIG. 5 is a schematic view showing the operation of kneading a thermoplastic resin and carbon fiber by means of a kneader in Example 7 of the present invention.
Figure 6:
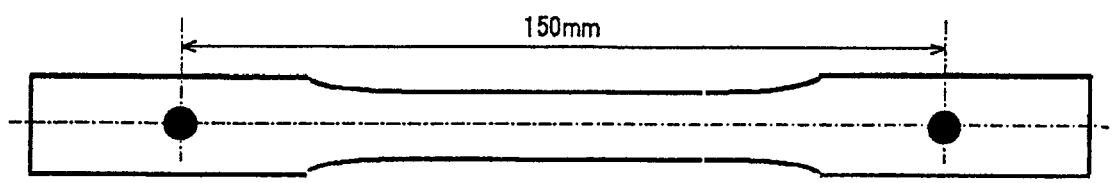
FIG. 6 is a diagrammatic view showing the method for measuring a conductivity.

As shown in FIG. 5, metal terminals were embedded by heat press in an ASTM No. 1 specimen prepared by injection molding using NESTAL SG75 (trade name, manufactured by SUMITOMO HEAVY INDUSTRIES, LTD.), at an interval of 150 mm using a commercially available soldering iron, and a resistance between the terminals was measured by means of a tester, MODEL 3010 manufactured by HIOKI E. E. CORPORATION.

(Elastic Modulus in Flexure)

With respect to the ASTM No. 1 specimen prepared by injection molding using NESTAL SG75 (trade name, manufactured by SUMITOMO HEAVY INDUSTRIES, LTD.), an elastic modulus in flexure was measured in accordance with ASTM D790.

(Surface Smoothness)

With respect to the ASTM No. 1 specimen prepared by injection molding using NESTAL SG75 (trade name, manufactured by SUMITOMO HEAVY INDUSTRIES, LTD.), average roughness of center line (Ra) was measured in accordance with JIS B0601 using HANDY SURF E-30A, manufactured by TOKYO SEIMITSU CO., LTD.

(Flame Retardancy)

Flame retardancy was measured in accordance with UL-Subject 94 V-0.

Example 1

80 wt % of polyamide A (UBE NYLON 1011FB, trade name, manufactured by UBE INDUSTRIES LTD.) was fed to an extruder (Tem35B, trade name, manufactured by TOSHIBA MACHINE CO., LTD.) having a screw construction shown in FIG. 1, and, after the resin became in a molten state (resin temperature: 280° C.), as shown in FIG. 1, carbon fiber (PYROFIL TR06NEB3E, trade name, manufactured by MITSUBISHI RAYON CO., LTD.) was fed to the extruder so that the content of the carbon fiber in the resulting mixture became 20 wt %, and the mixture was kneaded and pelletized, followed by measurement of the carbon fiber length distribution. Further, ASTM No. 1 specimens were prepared from the resulting pellets by injection molding by means of NESTAL SG75, trade name, manufactured by SUMITOMO HEAVY INDUSTRIES, LTD., at a resin temperature of 280° C. at a mold temperature of 80° C., and then, a conductivity, an elastic modulus in flexure and surface smoothness were measured with respect to the specimens. The results are shown in Table 1.

Comparative Example 1

Substantially the same procedure as in Example 1 was conducted except that an extruder having a screw construction shown in FIG. 2 was used, and carbon fiber length distribution, a conductivity, an elastic modulus in flexure and surface smoothness were measured. The results are shown in Table 1.

Example 2

90 wt % of polyamide A (UBE NYLON 1011FB, trade name, manufactured by UBE INDUSTRIES LTD.) was fed to an extruder (Tem35B, trade name, manufactured by TOSHIBA MACHINE CO., LTD.) having a screw construction shown in FIG. 1, and, after the resin became in a molten state (resin temperature: 280° C.), as shown in FIG. 1, carbon fiber (FORTAFIL 243, manufactured by FORTAFIL FIBERS, INC.) was fed to the extruder so that the content of the carbon fiber in the resulting mixture became 10 wt %, and the mixture was kneaded and pelletized, followed by measurement of the carbon fiber length distribution. Further, ASTM No. 1 specimens were prepared from the resulting pellets by injection molding by means of NESTAL SG75, manufactured by SUMITOMO HEAVY INDUSTRIES, LTD., at a resin temperature of 280° C. at a mold temperature of 80° C., and then, a conductiveity, an elastic modulus in flexure, and surface smoothness were measured with respect to the specimens. The results are shown in Table 1.

Comparative Example 2

Substantially the same procedure as in Example 2 was conducted except that an extruder having a screw construction shown in FIG. 2 was used, and carbon fiber length distribution, a conductivity, an elastic modulus in flexure, and surface smoothness were measured. The results are shown in Table 1.

Example 3

47 wt % of polyamide A (UBE NYLON 1011FB, trade name, manufactured by UBE INDUSTRIES LTD.), 5 wt % of polyamide B (GRIVORY 21, trade name, manufactured by EMS-CHEMIE), 7 wt % of antimony oxide (antimony trioxide No. 0 manufactured by MIKUNI SMELTING & REFINING CO., LTD.), and 21 wt % of a flame retardant (GLC PDBS-80, trade name, manufactured by GREAT LAKES CHEMICAL CORPORATION) were fed to an extruder (Tem35B, trade name, manufactured by TOSHIBA MACHINE CO., LTD.) having a screw construction shown in FIG. 1, and, after the resin became in a molten state (resin temperature: 280° C.), as shown in FIG. 1, carbon fiber (PYROFIL TR06NEB3E, trade name, manufactured by MITSUBISHI RAYON CO., LTD.) was fed to the extruder so that the content of the carbon fiber in the resulting mixture became 20 wt %, and the mixture was kneaded and pelletized, followed by measurement of the carbon fiber length distribution. Further, ASTM No. 1 specimens were prepared from the resulting pellets by injection molding by means of NESTAL SG75 manufactured by SUMITOMO HEAVY INDUSTRIES, LTD., at a resin temperature of 280° C. at a mold temperature of 80° C., and then, a conductivity, an elastic modulus in flexure, surface smoothness, and flame retardancy were measured with respect to the specimens. The results are shown in Table 1.

Example 4

80 wt % of polycarbonate-ABS (UBELOY CX55B, trade name, manufactured by UBE CYCON, LTD.) was fed to an extruder (Tem35B, trade name, manufactured by TOSHIBA MACHINE CO., LTD.) having a screw construction shown in FIG. 1, and, after the resin became in a molten state (resin temperature: 280° C.), as shown in FIG. 1, carbon fiber (FORTAFIL 243, trade name, manufactured by FORTAFIL FIBERS, INC.) was fed to the extruder so that the content of the carbon fiber in the resulting mixture became 20 wt %, and the mixture was kneaded and pelletized, followed by measurement of the carbon fiber length distribution. Further, ASTM No. 1 specimens were prepared from the resulting pellets by injection molding by means of NESTAL SG75 manufactured by SUMITOMO HEAVY INDUSTRIES, LTD., at a resin temperature of 280° C. at a mold temperature of 80° C., and then, a conductivity, an elastic modulus in flexure, and surface smoothness were measured with respect to the specimens. The results are shown in Table 1.

Example 5

70 wt % of polyamide A (UBE NYLON 1011FB, trade name, manufactured by UBE INDUSTRIES LTD.) was fed to an extruder (Tem35B, trade name, manufactured by TOSHIBA MACHINE CO., LTD.) having a screw construction shown in FIG. 1, and, after the resin became in a molten state (resin temperature: 280° C.), as shown in FIG. 1, carbon fiber (CFPA-LC3, trade name, manufactured by NIPPON POLYMER SANGYO CO., LTD.) was fed to the extruder so that the content of the carbon fiber in the resulting mixture became 30 wt %, and the mixture was kneaded and pelletized, followed by measurement of the carbon fiber length distribution. Further, ASTM No. 1 specimens were prepared from the resulting pellets by injection molding by means of NESTAL SG75 manufactured by SUMITOMO HEAVY INDUSTRIES, LTD., at a resin temperature of 280° C. at a mold temperature of 80° C., and then, a conductivity, an elastic modulus in flexure, and surface smoothness were measured with respect to the specimens. The results are shown in Table 2.

Comparative Example 3

Substantially the same procedure as in Example 5 was conducted except that an extruder having a screw construction shown in FIG. 2 was used, and carbon fiber length distribution, a conductivity, an elastic modulus in flexure, and surface smoothness were measured. The results are shown in Table 2.

Comparative Example 4

Figure 3:
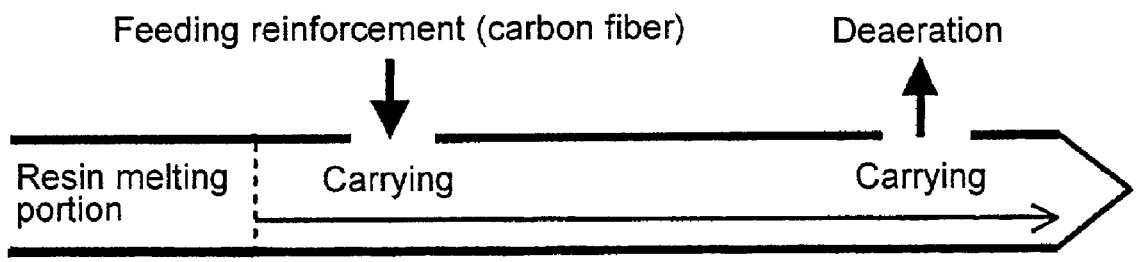
FIG. 3 is a schematic view showing the operation of kneading a thermoplastic resin and carbon fiber by means of a kneader in Comparative Example 4 of the present invention.

Substantially the same procedure as in Example 5 was conducted except that an extruder having a screw construction shown in FIG. 3 was used, and carbon fiber length distribution, a conductivity, an elastic modulus in flexure, and surface smoothness were measured. The results are shown in Table 2.

Example 6

Figure 4:
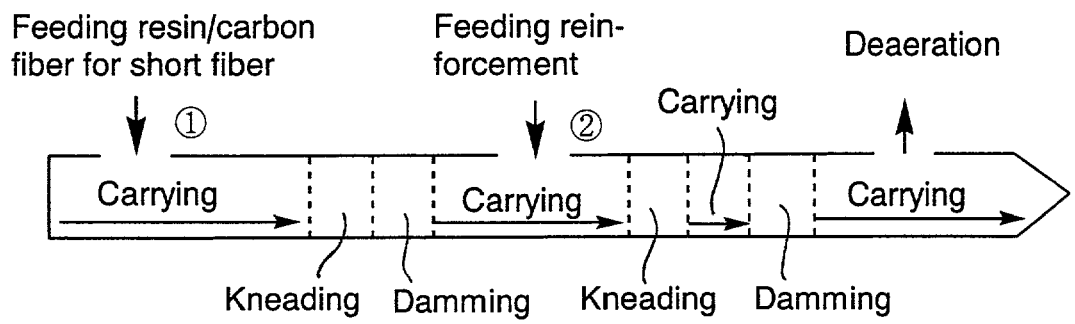
FIG. 4 is a schematic view showing the operation of kneading a thermoplastic resin and carbon fiber by means of a kneader in Example 6 of the present invention.

46 wt % of polyamide A (UBE NYLON 1011FB, trade name, manufactured by UBE INDUSTRIES LTD.), 2 wt % of polyamide B (GRIVORY 21, trade name, manufactured by EMS-CHEMIE), 7 wt % of antimony oxide (antimony trioxide No. 0 manufactured by MIKUNI SMELTING & REFINING CO., LTD.), 20 wt % of a flame retardant (GLC PDBS-80, trade name, manufactured by GREAT LAKES CHEMICAL CORPORATION) and 5 wt % of carbon fiber (FORTAFIL 243, trade name, manufactured by FORTAFIL FIBERS, INC.) were fed from ① of FIG. 4 to an extruder (Tem35B, trade name, manufactured by TOSHIBA MACHINE CO., LTD.) having a screw construction shown in FIG. 4, and, after the resin became in a molten state (resin temperature: 280° C.), from ② of FIG. 4, 20 wt % of carbon fiber (Pyrofil TR06NEB3E, trade name, manufactured by MITSUBISHI RAYON CO., LTD.) was fed to the extruder, and the mixture was kneaded and pelletized, followed by measurement of the carbon fiber length distribution. Further, ASTM No. 1 specimens were prepared from the resulting pellets by injection molding by means of NESTAL SG75 manufactured by SUMITOMO HEAVY INDUSTRIES, LTD., at a resin temperature of 280° C. at a mold temperature of 80° C., and then, a conductivity, an elastic modulus in flexure and surface smoothness were measured with respect to the specimens. The results are shown in Table 1.

TABLE 1

|   |   |   | Example 1 | Comparative example 1 | Example 2 | Comparative example 2 | Example 3 | Example 4 | Example 6 |
|---|---|---|---|---|---|---|---|---|---|
| Resin | Polyamide A | wt % | 80 | 80 | 90 | 90 | 47 |  | 46 |
|  | Polyamide B | wt % |  |  |  |  | 5 |  | 2 |
|  | Polycarbonate ABS | wt % |  |  |  |  |  | 80 |  |
| Carbon fiber | A | wt % | 20 | 20 |  |  | 20 |  | 20② |
|  | B | wt % |  |  | 10 | 10 |  | 20 | 5① |
| Flame retardant |  | wt % |  |  |  |  | 21 |  | 20 |
| Flame retardant aid | Antimony oxide | wt % |  |  |  |  | 7 |  | 7 |

TABLE 1-continued

|  |  | Example 1 | Comparative example 1 | Example 2 | Comparative example 2 | Example 3 | Example 4 | Example 6 |
|---|---|---|---|---|---|---|---|---|
| Kneading conditions | | FIG. 1 | FIG. 2 | FIG. 1 | FIG. 2 | FIG. 1 | FIG. 1 | FIG. 4 |
| Carbon fiber length distribution | 0 to less than 50 μm wt % | 0.2 | 0.3 | 0.1 | 0.2 | 0.3 | 0.2 | 20.2 |
| | 50 to less than 500 μm wt % | 72.1 | 94.3 | 70.3 | 92.5 | 71.2 | 70.3 | 57.0 |
| | 500 μm or more wt % | 27.7 | 5.4 | 29.6 | 7.3 | 28.5 | 29.5 | 22.8 |
| Conductivity | Ω | $10^1$ | $10^3$ | $10^3$ | $10^5$ | $10^3$ | $10^2$ | $10^0$ |
| Flame retardancy | UL 0.4 mmt | | | | | Corresponding to V-0 | | Corresponding to V-0 |
| Elastic modulus in flexure | GPa | 20.4 | 18.4 | 13.6 | 11.8 | 21.8 | 19.8 | 22.0 |
| Surface smoothness | Ra | 30 | 20 | 28 | 15 | 2 | 10 | 2 |

TABLE 2

|  |  |  | Example 5 | Comparative example 3 | Comparative example 4 |
|---|---|---|---|---|---|
| Resin | Polyamide A | wt % | 70 | 70 | 70 |
| Carbon fiber | C | wt % | 30 | 30 | 30 |
| Kneading conditions | | | FIG. 1 | FIG. 2 | FIG. 3 |
| Carbon fiber length distribution | 0 to less than 50 μm | wt % | 0.3 | 0.5 | 0.1 |
| | 50 to less than 500 μm | wt % | 73 | 96.7 | 33.6 |
| | 500 μm or more | wt % | 26.7 | 2.8 | 66.3 |
| Conductivity | | Ω | $10^2$ | $10^3$ | $10^2$ |
| Surface smoothness | | Ra | 40 | 38 | 120 |

Example 7

70 wt % of polyamide A (UBE NYLON 1011FB, trade name, manufactured by UBE INDUSTRIES LTD.) and 10 wt % of carbon fiber (CFPA-LC3, trade name, manufactured by NIPPON POLYMER SANGYO CO., LTD.) were fed from ① of FIG. 5 to an extruder (Tem35B, trade name, manufactured BY TOSHIBA MACHINE CO., LTD.) having a screw construction shown in FIG. 5, and, after the resin became in a molten state (resin temperature: 280° C.), from ② of FIG. 5, 20 wt % of carbon fiber (CFPA-LC3, trade name, manufactured by NIPPON POLYMER SANGYO CO., LTD.) was fed to the extruder, and the mixture was kneaded and pelletized, followed by measurement of the carbon fiber length distribution. Further, ASTM No. 1 specimens were prepared from the resulting pellets by injection molding by means of NESTAL SG75 manufactured by SUMITOMO HEAVY INDUSTRIES, LTD., at a resin temperature of 280° C. at a mold temperature of 80° C., and then, a conductivity, an elastic modulus in flexure and surface smoothness were measured with respect to the specimens. The results are shown in Table 3.

Comparative Example 5

70 wt % of polyamide A (UBE NYLON 1011FB, trade name, manufactured by UBE INDUSTRIES LTD.) was fed from ① of FIG. 5 to an extruder (Tem35B, trade name, manufactured by TOSHIBA MACHINE CO., LTD.) having a screw construction shown in FIG. 5, and, after the resin became in a molten state (resin temperature: 280° C.), from ② of FIG. 5, carbon fiber (CFPA-LC3, trade name, manufactured by NIPPON POLYMER SANGYO CO., LTD.) was fed to the extruder so that the content of the carbon fiber in the resulting mixture became 30 wt %, and the mixture was kneaded and pelletized, followed by measurement of the carbon fiber length distribution. Further, ASTM No. 1 specimens were prepared from the resulting pellets by injection molding by means of NESTAL SG75 manufactured by SUMITOMO HEAVY INDUSTRIES, LTD., at a resin temperature of 280° C. at a mold temperature of 80° C., and then, a conductivity, an elastic modulus in flexure and surface smoothness were measured with respect to the specimens. The results are shown in Table 3.

Comparative Example 6

80 wt % of polyamide A (UBE NYLON 1011FB, trade name, manufactured by UBE INDUSTRIES LTD.) was fed from ① of FIG. 5 to an extruder (Tem35B, trade name, manufactured by TOSHIBA MACHINE CO., LTD.) having a screw construction shown in FIG. 5, and, after the resin became in a molten state (resin temperature: 280° C.), from ② of FIG. 5, carbon fiber (CFPA-LC3, trade name, manufactured by NIPPON POLYMER SANGYO CO., LTD.) was fed to the extruder so that the content of the carbon fiber in the resulting mixture became 20 wt %, and the mixture was kneaded and pelletized, followed by measurement of the carbon fiber length distribution. Further, ASTM No. 1 specimens were prepared from the resulting pellets by injection molding by means of NESTAL SG75 manufactured by SUMITOMO HEAVY INDUSTRIES, LTD., at a resin temperature of 280° C. at a mold temperature of 80° C., and then, a conductivity, an elastic modulus in flexure and surface smoothness were measured with respect to the specimens. The results are shown in Table 3.

Example 8

75 wt % of polyamide B (UBE NYLON 1015B, trade name, manufactured by UBE INDUSTRIES LTD.), 10 wt % of AES resin (acrylonitrile-ethylene-propylene-diene (EPDM)-styrene resin) (WX270, trade name, available from UBE CYCON, LTD.) and 5 wt % of carbon fiber (FORTAFIL 243, trade name, manufactured by FORTAFIL FIBERS, INC.) were fed from ① of FIG. 5 to an extruder (Tem35B, trade name, manufactured by TOSHIBA MACHINE CO., LTD.) having a screw construction shown in FIG. 5, and, after the resin became in a molten state (resin temperature: 280° C.), from ② of FIG. 5, 10 wt % of carbon fiber (Fortafil 243, trade name, manufactured by FORTAFIL FIBERS, INC.) was additionally fed to the extruder, and the mixture was kneaded and pelletized, followed by measurement of the carbon fiber length distribution. Further, ASTM No. 1 specimens were prepared from the resulting pellets by injection molding by means of NESTAL SG75 manufactured by SUMITOMO HEAVY INDUSTRIES, LTD., at a resin temperature of 280° C. at a mold temperature of 80° C., and then, a conductivity, an elastic modulus in flexure and surface smoothness were measured with respect to the specimens. The results are shown in Table 3.

Comparative Example 7

80 wt % of polyamide B (UBE NYLON 1015B, trade name, manufactured by UBE INDUSTRIES LTD.) and 10 wt % of AES resin (WX270, trade name, available from UBE CYCON, LTD.) were fed from ① of FIG. 5 to an extruder (Tem35B, trade name, manufactured by TOSHIBA MACHINE CO., LTD.) having a screw construction shown in FIG. 5, and, after the resin became in a molten state (resin temperature: 280° C.), from ② of FIG. 5, carbon fiber (FORTAFIL 243, trade name, manufactured by FORTAFIL FIBERS, INC.) was fed to the extruder so that the content of the carbon fiber in the resulting mixture became 10 wt %, and the mixture was kneaded and pelletized, followed by measurement of the carbon fiber length distribution. Further, ASTM No. 1 specimens were prepared from the resulting pellets by injection molding by means of NESTAL SG75 manufactured by SUMITOMO HEAVY INDUSTRIES, LTD., at a resin temperature of 280° C. at a mold temperature of 80° C., and then, a conductivity, an elastic modulus in flexure and surface smoothness were measured with respect to the specimens. The results are shown in Table 3.

Comparative Example 8

80 wt % of polyamide B (UBE NYLON 1015B, trade name, manufactured by UBE INDUSTRIES LTD.), 10 wt % of AES resin (WX270, trade name, available from UBE CYCON, LTD.) and 10 wt % of carbon fiber (FORTAFIL 243, trade name, manufactured by FORTAFIL FIBERS, INC.) were fed from ① of FIG. 5 to an extruder (Tem35B, trade name, manufactured by TOSHIBA MACHINE CO., LTD.) having a screw construction shown in FIG. 5, and the mixture was kneaded and pelletized, followed by measurement of the carbon fiber length distribution. Further, ASTM No. 1 specimens were prepared from the resulting pellets by injection molding by means of NESTAL SG75 manufactured by SUMITOMO HEAVY INDUSTRIES, LTD., at a resin temperature of 280° C. at a mold temperature of 80° C., and then, a conductivity, an elastic modulus in flexure and surface smoothness were measured with respect to the specimens. The results are shown in Table 3.

TABLE 3

| | | | Example 6 | Comp. ex. 5 | Comp. ex. 6 | Example 7 | Comp. ex. 7 | Comp. ex. 8 |
|---|---|---|---|---|---|---|---|---|
| Resin | Polyamide A | wt % | 70 | 70 | 80 | | | |
| | Polyamide B | wt % | | | | 75 | 80 | 80 |
| | AES resin | wt % | | | | 10 | 10 | 10 |
| | Feeding portion | | ① | ① | ① | ① | ① | ① |
| Carbon fiber | A | wt % | 10 | | | | | |
| | B | wt % | | | | 5 | | 10 |
| | Feeding portion | | ① | | | ① | | ① |
| Carbon fiber | A | wt % | 20 | 30 | 20 | | | |
| | B | wt % | | | | 10 | 10 | |
| | Feeding portion | | ② | ② | ② | ② | ② | |
| Carbon fiber length distribution | Not more than 50 μm | wt % | 9 | 1 | 0 | 5 | 0 | 10 |
| | More than 50 μm | wt % | 21 | 29 | 20 | 10 | 10 | 0 |
| Conductivity | | Ω | $10^1$ | $10^1$ | $10^2$ | $10^2$ | $10^3$ | $10^{15}$ |
| Elastic modulus in flexure | | MPa | 241 | 255 | 221 | 117 | 107 | 61 |
| Surface smoothness | | Ra | 40 | 73 | 37 | 0.2 | 0.2 | 0.1 or less |

According to the present invention, by incorporating into a thermoplastic resin a predetermined amount of carbon fiber having a broad fiber length distribution, there can be obtained a resin composition having not only such high conductivity that it can be used as a shield against electromagnetic waves but also high rigidity and excellent surface smoothness.

Thus, there can be provided a conductive resin composition which can be advantageously used as an electromagnetic wave shield required to have high conductivity and high rigidity, and which further can be advantageously used as a housing and a cover for electrical apparatus, especially for personal computer.

The invention claimed is:

1. A process for producing a conductive resin composition comprising a thermoplastic resin and carbon fiber, said carbon fiber being present in an amount of 10 to 50 parts by weight based on 100 parts by weight of said resin composition, wherein 10 to 50% by weight of said carbon fiber is comprised of carbon fiber having a fiber length of 500 µm or more, said process comprising:

feeding said thermoplastic resin to a kneader from the top portion thereof; and feeding said carbon fiber to the kneader from a medium portion thereof to melt and knead the resulting mixture, wherein the operation of the kneading after feeding said carbon fiber is conducted in the order of carrying, kneading, carrying, damming and carrying.

2. A process for producing a conductive resin composition comprising a thermoplastic resin and carbon fiber, said carbon fiber being present in an amount of 10 to 50 parts by weight based on 100 parts by weight of said resin composition, wherein 10 to 50% by weight of said carbon fiber is comprised of carbon fiber having a fiber length of 500 µm or more, said thermoplastic resin is a polyamide resin, said process comprising:

feeding said thermoplastic resin to a kneader from a top portion thereof; and feeding carbon fiber to the kneader from a medium portion thereof to melt and knead the resulting mixture, wherein the operation of the kneading after feeding said carbon fiber is conducted in the order of carrying, kneading, carrying, damming and carrying.

3. A process for producing a conductive resin composition comprising a thermoplastic resin and carbon fiber, wherein the carbon fiber is present in an amount of 10 to 50 parts by weight based on 100 parts by weight of the resin composition, wherein 3 to 12 parts by weight of the carbon fiber is a carbon fiber having a fiber length of 50 µm or less and 7 to 38 parts by weight of the carbon fiber is a carbon fiber having a fiber length of more than 50 µm, which process comprises the steps of mixing and feeding said thermoplastic resin and said carbon fiber to a kneader to melt and knead the resulting mixture, wherein the carbon fiber is fed from at two or more portions by dividing the carbon fiber into two or more portions.

4. The process according to claim 3, wherein the thermoplastic resin and 3 to 12 parts by weight of the carbon fiber are fed from a top portion of the kneader, and 7 to 38 parts by weight of the carbon fiber is fed from a medium portion of the kneader.

5. The process according to claim 3, wherein said thermoplastic resin is a polyamide resin.

6. The process according to claim 5, wherein the thermoplastic resin and 3 to 12 parts by weight of the carbon fiber are fed from a top portion of the kneader, and 7 to 38 parts by weight of the carbon fiber is fed from a medium portion of the kneader.

7. A process for producing a conductive resin composition comprising a thermoplastic resin and carbon fiber, wherein the carbon fiber is present in an amount of 10 to 50 parts by weight based on 100 parts by weight of the resin composition, 10 to 50% by weight of the carbon fiber is a carbon fiber having a fiber length of 500 µm or more, and 3 to 12 parts by weight of the carbon fiber is a carbon fiber having a fiber length of 50 µm or less and 7 to 38 parts by weight of the carbon fiber is a carbon fiber having a fiber length of more than 50 µm, said process comprising:

feeding said thermoplastic resin to a kneader from the top portion thereof; and feeding said carbon fiber to the kneader from a medium portion thereof to melt and knead the resulting mixture, wherein the operation of the kneading after feeding the carbon fiber is conducted in the order of carrying, kneading, carrying, damming and carrying; and the carbon fiber is fed from at two or more portions by dividing the carbon fiber into two or more portions.

8. The process according to claim 7, wherein the thermoplastic resin and 3 to 12 parts by weight of the carbon fiber are fed from a top portion of the kneader, and 7 to 38 parts by weight of the carbon fiber is fed from a medium portion of the kneader.

* * * * *